Patented Apr. 16, 1946

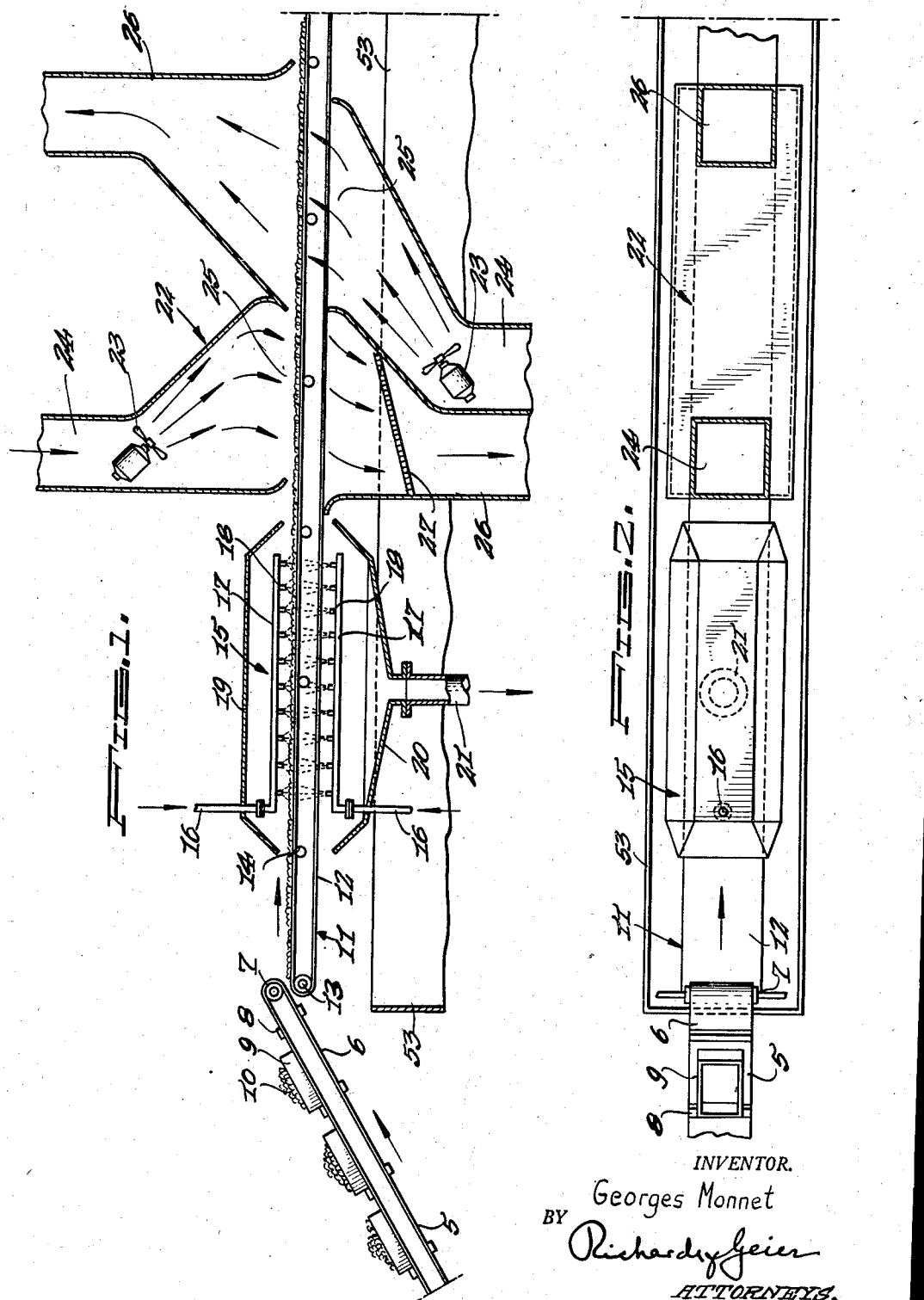

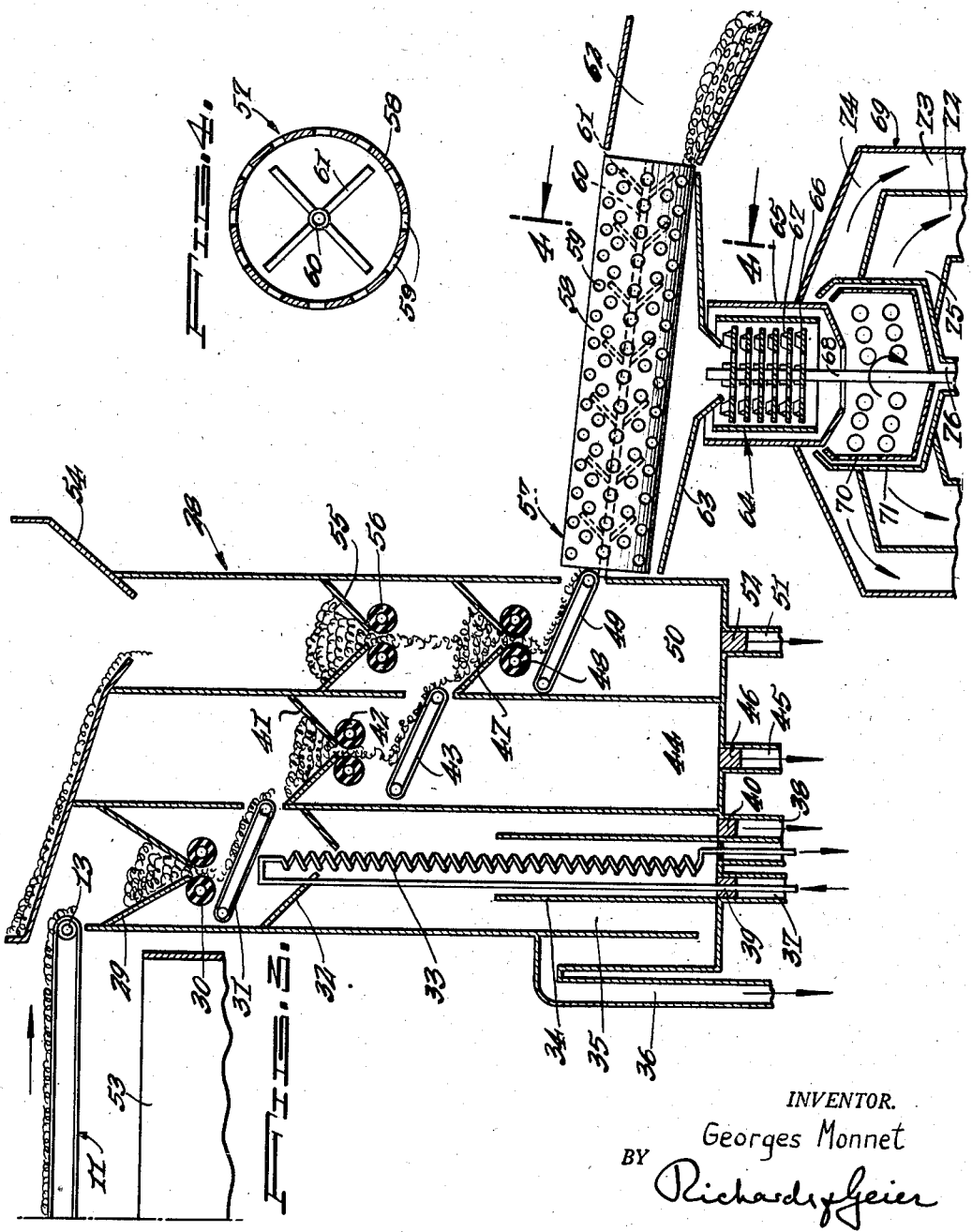

2,398,440

UNITED STATES PATENT OFFICE 2,398,440

GRAPE PROCESSING MACHINE

Georges Monnet, New York, N. Y.

Application June 23, 1944, Serial No. 541,741

3 Claims. (Cl. 146—76)

This invention relates to improvements in grape processing machines. One of its objects is to provide a machine of the character mentioned, that receives the grapes in boxes from the vineyard, permits of selecting the different grapes in accordance with their type and condition, cleans the grapes by means of a pressure spray of water, dries the cleaned grapes by means of forced air circulation, extracts and segregates their different types of juice by crushing them under successively greater pressures, removes the impurities from the free juice by means of quick cooling, precipitation, decantation, and siphonage, collects the different juices in tanks, de-stems the residue by means of a de-stemming device, and separates the pits from the skins and further reduces the pulp by means of a pulp shredding device and a centrifuge separator. A further purpose is to provide a machine that extracts clear juice from red grapes.

Another object is to provide a machine that extracts juice from grapes without crushing the stems, pits or skins and thus preventing contamination of the juice with the colored matter, oils and other solid and liquid matter therein contained.

A further object is to provide rollers for such machines, of superior materials heretofore unused for such purposes to wit, resilient materials, such as rubber.

A still further object is to provide an improved process or method of producing wine juices of superior clarity, purity and taste from grapes.

These objects are attained by mechanism illustrated in the accompanying drawings, in which:

Figures 1 and 3 (Figure 3 being a continuation of Figure 1) are a vertical section of the entire machine;

Figure 2 is a plan view of that part of the machine which is shown in Figure 1; and Figure 4 is a section of a part of the machine on the line 4—4, Figure 3.

Conveyor 5, consisting of an endless belt 6 on rollers 7, said belt having spaced outer projections or box backstops 8, carries boxes 9 of grapes 10 from the general vicinity of the vineyard to the grape processing machine herein disclosed. The grapes are removed from the boxes and are placed on conveyor 11 which consists of an endless belt 12 of sieve-like material, such as copper screening or screening of metal suitable for the purpose other than copper, on end rollers 13 and intermediate supporting rollers 14. Here a last minute selection is made of the grapes (a previous selection having been made before the grapes were placed in boxes 9) and the grapes permitted to remain on conveyor 11 are then carried by said conveyor to and through water spraying device 15.

Water spraying device 15 consists of two inlet water pipes 16 connected with two horizontal pipes 17 longitudinally disposed one above and one below conveyor 11. Horizontal pipes 17 are each equipped with a fair number (ten or more or less) of nozzles 18 which are focussed in the direction of conveyor 11. A spray of water issues out of nozzles 18 under a fair amount of pressure and washes the grapes as they pass on the conveyor between horizontal pipes 17. Upper shed 19 and lower catch basin 20 situated, respectively, above and below said horizontal pipes 17 confine the spray to the water spraying device 15. The lower catch basin 20 catches the expended water and outlet drain 21 permits of its disposal. Such usable matter as is washed away is collected for use hereinafter described.

The washed grapes are now carried by conveyor 11 to and through drying device 22 which consists of upper and lower electrically driven fans or blowers 23 situated within inlet ducts 24 whose outlet portions 25 are considerably expanded cross-sectionally, and are focussed upon conveyor 11. Opposite inlet ducts 24 and of substantially corresponding shape and dimensions are upper and lower exhaust ducts 26. The blowers 23 dry the grapes by forcing a stream of air in through inlet ducts 24 to and upon the grapes on conveyor 11, and thence out through exhaust ducts 26. Screen 27 situated within the lower exhaust duct 26 catches such grapes as are blown off the conveyor.

Conveyor 11 now carries the washed and dried grapes to the crushing device 28 which extracts their juices. This device consists of a spaced series of spaced, double rollers, each pair of rollers consisting of two parallel rollers situated at a predetermined distance apart, and rotating in opposite directions toward one another above and away from one another below. These rollers are all constructed of resilient material such as rubber or at least they have working surfaces of such material. Situated above each pair of rollers is a hopper and situated below each pair (but one) and linking them functionally is a downwardly sloping conveyor constructed in substantially the same way and of substantially the same materials as conveyor 11. Further particulars follow.

The washed and dried grapes carried by conveyor 11 are deposited by that conveyor into hopper 29 which is situated above rollers 30 which in turn are situated above downwardly sloping conveyor 31. It is the function of rollers 30 merely to break the grapes open without crushing any part of them. This liberates the free juices which are clear juices, whether they emanate from white grapes or red grapes or grapes of another color. The hopper 29 thus feeds the washed and dried grapes to the rotating rollers 30 which are spaced apart sufficiently to break the grapes open and to do no more. Proper spacing, however, would not alone produce the desired result since the hard bronze rollers currently in use would, if spaced too closely, crush the grapes, and if spaced not to crush the grapes, would permit too many unopened grapes to pass between them.

When the grapes are thus broken open, they and their liberated free juices fall to conveyor 31. The juices trickle through said conveyor to bottomless trough 32 which in turn directs their flow to and upon refrigerant containing cooling coil 33 which is situated in tank 34. The purpose of coil 33 is to cool the juices to a temperature not exceeding 40° Fahrenheit. This has the effect of facilitating the precipitation of all impurities and particles of solid matter contained in said liberated juices. These impurities and particles fall to the bottom of tank 34 while the clear juices are automatically decanted into larger tank 35 (which surrounds and is concentric with tank 34) and are thence siphoned out through built-in siphon 36 for refrigerated storage or for such immediate use as might be planned for them. Drains 37 and 38 situated, respectively, in tanks 34 and 35 serve as the outlets through which the impurities which collect at the bottom of said tanks are drained. Stoppers 39 and 40 situated, respectively, in drains 37 and 38, perform the usual functions of drain stoppers.

Downwardly sloping conveyor 31 carries the opened grapes to, and deposits them into, second hopper 41 which is situated above the second pair of rollers 42 which in turn are situated above the second downwardly sloping conveyor 43. Rollers 42 are spaced somewhat closer to one another than are rollers 30 for the reason that their function is to apply greater pressure upon the grapes. Rollers 42 crush the pulp of the grapes but leave their pits, stems and skins whole and intact. They are enabled to perform this unique function by reason of their resilient construction hereinabove described. The opened grapes are fed by hopper 41 to rollers 42 and, as already indicated, rollers 42 crush their pulp, liberating the juices therein contained. The pulp crushed grapes and their pulp juices now fall upon downwardly sloping conveyor 43. The juices pass through conveyor 43 to tank 44 situated below and are removed therefrom through drain 45 which is situated at the bottom of tank 44. Stopper 46 in drain 45 performs the usual function of drain stoppers.

Downwardly sloping conveyor 43 carries the pulp crushed grapes to, and deposits them into, third hopper 47 which is situated above the third pair of rollers 48 which in turn are situated above the third downwardly sloping conveyor 49. Rollers 48 are spaced even closer together than are rollers 42 for the reason that their function is to crush the last bit of juice out of the pulp crushed grapes without, however, crushing the pits and stems. Again this function is rendered possible only by reason of the employment of rollers of the resilient construction above described. Hopper 47 feeds the pulp crushed grapes to rollers 48 and, as above mentioned, rollers 48 exert a maximum of pressure upon said grapes, commensurate with leaving the stems and pits intact. The fully crushed grapes together with their last liberated juices now drop down upon the third downwardly sloping conveyor 49. The juices pass through conveyor 49 to tank 50 situated below and are removed therefrom through drain 51 which is situated at the bottom of tank 50. Stopper 52 in drain 51 performs the usual function of drain stoppers.

At this point it is necessary to return to the conveyor 11 which carries the grapes selected for processing from conveyor 5 through water spraying device 15, through drying device 22 and to crushing device 28. Throughout its course (except where there would be interference with the functioning of devices 15 and 22) conveyor 11 has situated below it, a trough 53 which catches such grapes as fall off conveyor 11 as it moves along. These grapes, together with such grapes as are removed from boxes 9 and conveyor 11 as not being fit for the full processing procedure hereinabove described, together with such grapes as are collected in catch basin 20 and through drain 21, as well as together with such grapes as are collected on screen 27, are placed, after the usual preliminary conditioning (washing and drying), in hopper 54 which is situated above crushing device 28. Hopper 54 feeds these less desirable grapes to another hopper 55 located beneath hopper 54, which in turn feeds said grapes to a pair of rollers 56 which are located above previously mentioned hopper 47. Rollers 56 are of the same general construction as the other rollers herein mentioned, and they perform substantially the same function as the other rollers perform, particularly rollers 42. Rollers 56 are just about as close to one another as are rollers 42. After the last mentioned grapes pass through rollers 56 they fall into hopper 47. From that point on they are processed in the same way as the fully processed grapes herein mentioned.

Conveyor 49 now carries the fully crushed grapes which fall upon it from rollers 48, to de-stemming device 57 and deposits said grapes therein. De-stemming device 57 consists of a downwardly sloping cylinder 58 having suitable perforations 59 formed therein, said cylinder slowly rotating around a relatively faster rotating shaft 60 centrally and longitudinally disposed therein. Affixed to said shaft are a plurality of outwardly projecting knives 61. These knives cut through the fully crushed grapes, and loosen and remove their stems, which are carried out through the lower end of cylinder 58 in response to the pull of gravity and the push of the knives. After passing out of cylinder 58 the stems fall into another downwardly sloping cylinder 62. Cylinder 62 is somewhat cone-shaped, its smaller opening being of substantially the same diameter as that of cylinder 58, said smaller opening of cylinder 62 being disposed adjacent to and opposite the lower opening of cylinder 58. The stems are removed from cylinder 62 through its larger opening, for such disposal or use as may be deemed appropriate.

The remaining parts of the fully crushed grapes, to wit: their skins, crushed pulp and pits, pass through perforations 59 in cylinder 58 and fall into the shallow hopper 63. From there they drop down into pulp shredding device 64 which consists of a substantially cylindrical body 65 housing a vertical series of spaced, horizontally disposed circular perforated plates 66 with which are connected a plurality of vertically disposed knives 67, said plates being centrally affixed to a rotating vertically disposed shaft 68 which passes through their center portions. Knives 67 shred the crushed pulp and loosen and free the pits therefrom. The shredding or macerating operation commences on the uppermost plate 66 and continues on each succeeding lower plate, the macerated pulp falling through the perforations of one plate on to the next lower plate until it finally falls through the open bottom of the housing 65.

When this process is completed, the skin, shredded pulp, and liberated pits fall into centrifuge separator 69. Centrifuge separator 69 is composed of a suitably perforated drum 70 which, like plates 66, is disposed around rotating shaft 68 and centrally affixed to it, said shaft passing through the center portion of the bottom of said drum 70. A stationary body portion 71 of substantially the same shape as that of drum 70 and also suitably perforated, surrounds said drum, concentrically disposed with respect thereto. Surrounding said body portion 71 are concentric receptacles 72 and 73 the upper portions of their respective walls turning inwardly toward body portion 71 and forming parallel, almost horizontal passages 74 and 75 leading from said body portion 71 to said receptacles, the upper passage 74 leading to outer receptacle 73, the lower passage 75 leading to the inner receptacle 72. The centrifuge separator 69 functions in the usual manner, separating the skins from the pits by virtue of the centrifugal force generated and in accordance with their respective weights. The pits are hurled through the perforations in drum 70 and body portion 71 and into and through passage 74 and thence into receptacle 73. Similarly, the skins are hurled through the perforations in drum 70 and body portion 71 and into and through passage 75 and thence into receptacle 72. The shredded pulp and such juice as the pulp is still able to yield, pass through the perforations in drum 70 and through passage 76 located at the bottom of body portion 71. Pits, skins, and pulp and remaining juice are thus separately collected for such use or disposal as may be deemed advisable.

The entire machine is functionally coordinated and fully synchronized in speed and movement in accordance both with the principles of sound grape processing and with the principles of the modern mass production conveyor system. The entire process from the picking of the grapes in the vineyard to the very last operation in the centrifuge separator should take between three and four hours.

It is apparent that the specific illustration shown above has been given by way of illustration and not by way of limitation and that the structures described above are subject to wide variations and modifications without departing from the scope or intent of the invention, all of which variations and modifications are to be included within the scope of the present invention.

What is claimed is:

1. A grape processing machine of the character described, comprising in combination a water spraying device for washing the grapes, a forced air circulating device for drying the grapes, a crushing device for extracting the different juices from the grapes in successive steps and under successively increased pressures, a cooling device for precipitating the impurities contained in the first of the extracted juices, a decanting device and a siphoning device to separate the clear juice from the precipitate, a de-stemming device for removing the stems from the crushed grapes, a pulp shredding device for loosening the pits from the pulp, and a centrifuge separator for separating the pulp, pits and skins, appropriate conveyors leading from the general vicinity of the vineyard to the water spraying device, from the water spraying device to the forced air circulating device, from the forced air circulating device to the crushing device and from the crushing device to the de-stemming device, the entire machine being functionally coordinated in all its parts and synchronized in the rate of speed and movement of its parts, substantially as described.

2. A grape processing machine of the character described, comprising in combination, a conveyor system leading from the general vicinity of the vineyard to a water spraying device consisting of an upward sprayer and a downward sprayer, a sieve-like conveyor passing between said sprayers and to and through a forced air circulating device consisting of an upward blower and a downward blower, said conveyor passing between said blowers and to a crushing device consisting of a series of several pairs of rollers made of rubber, at least to the extent of their respective surfaces, said pairs of rollers applying, successively, increased crushing pressure, sieve-like conveyors linking said pairs of rollers, except the last two pairs one of which is situated above the other, issuing directly to that other, a cooling device consisting of a refrigerant-containing coil of tubing situated in a tank underneath the first of rollers and a decanting device and a siphoning device connected with said tank, a sieve-like conveyor linking the last of said pairs of rollers with a de-stemming device consisting of a rotating, perforated drum and a relatively faster rotating shaft disposed longitudinally therein, said shaft having affixed thereto outwardly projecting knives, a pulp shredding device situated underneath said de-stemming device, consisting of a vertical series of spaced, horizontally rotating circular plates having knives connected therewith, and a centrifuge separator situated underneath said pulp shredding device and within concentric receptacles, the entire machine being functionally coordinated in all its parts and synchronized in the rate of speed and movement of its parts, substantially as described.

3. A grape processing machine of the character described, comprising in combination a water spraying device for washing the grapes, a grape drying device, a crushing device for extracting the different juices from the grapes in successive steps, a cooling device for precipitating the impurities contained in the first of the extracted juices, a decanting device, a siphoning device to separate the clear juices from the precipitate, a de-stemming device for removing the stems from the crushed grapes, a pulp shredding device for loosening the pits from the pulp, and a separator for separating the pulp, pits and skins, appropriate conveyors leading from the general vicinity of the vineyard to the water spraying device, and between each successive operational position of the machine.

GEORGES MONNET.